US012719284B2

(12) United States Patent
Kajita

(10) Patent No.: US 12,719,284 B2
(45) Date of Patent: Aug. 25, 2026

(54) CONTROL DEVICE, CONTROL METHOD, AND NON-TRANSITORY COMPUTER-READABLE STORAGE MEDIUM

(71) Applicant: HONDA MOTOR CO., LTD., Tokyo (JP)

(72) Inventor: Kosuke Kajita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 19/058,732

(22) Filed: Feb. 20, 2025

(65) Prior Publication Data

US 2025/0273963 A1 Aug. 28, 2025

(30) Foreign Application Priority Data

Feb. 28, 2024 (JP) ................................ 2024-028467

(51) Int. Cl.
*H02J 3/32* (2026.01)
*B60L 55/00* (2019.01)
(Continued)

(52) U.S. Cl.
CPC .............. *H02J 3/322* (2020.01); *B60L 55/00* (2019.02); *H02J 50/10* (2016.02); *H02J 50/80* (2016.02); *H02J 50/90* (2016.02)

(58) Field of Classification Search
CPC .. H02J 3/322; H02J 50/80; H02J 50/90; H02J 50/10; B60L 55/00
See application file for complete search history.

(56) References Cited

U.S. PATENT DOCUMENTS 8,655,530 B2 * 2/2014 Ichikawa ................ B60L 53/36 701/22
9,409,491 B2 * 8/2016 Ichikawa ................ B60L 53/38
(Continued)

FOREIGN PATENT DOCUMENTS

JP 2011-217461 A 10/2011
JP 2011-217462 A 10/2011
(Continued)

*Primary Examiner* — Gertrude Arthur Jeanglaude
(74) *Attorney, Agent, or Firm* — Paratus Law Group, PLLC

(57) ABSTRACT

A control device derives a target parking position of an electric vehicle having a secondary coil in a parking space, when electric power is exchanged in a contactless manner between the electric vehicle and a power receiving device having a primary coil installed in the parking space and allowed to supply electric power received by the primary coil to a power grid. The control device includes an acquisition unit which acquires power information indicating required power, and a derivation unit which derives the target parking position based on the acquired power information and efficiency information indicating power transmission efficiency at each of position relationships between the primary coil and the secondary coil. The derivation unit derives the target parking position where a second position relationship different from a first position relationship in which the power transmission efficiency is the highest is established, according to an amount of the required power.

8 Claims, 5 Drawing Sheets

(51) Int. Cl.

| | |
|---|---|
| ***H02J 50/10*** | (2016.01) |
| ***H02J 50/80*** | (2016.01) |
| ***H02J 50/90*** | (2016.01) |

(56) References Cited

U.S. PATENT DOCUMENTS

2013/0076296 A1* 3/2013 Ushiroda ................ B60L 53/30 320/109
2013/0326031 A1* 12/2013 Duarte ................ H04L 41/0803 709/221
2015/0291048 A1* 10/2015 Ichikawa ................ B60L 53/36 701/22
2015/0380948 A1* 12/2015 Mazaki ................. H02M 7/217 307/104

FOREIGN PATENT DOCUMENTS

JP 2014-239621 A 12/2014
WO WO 2014/199203 A2 12/2014

* cited by examiner

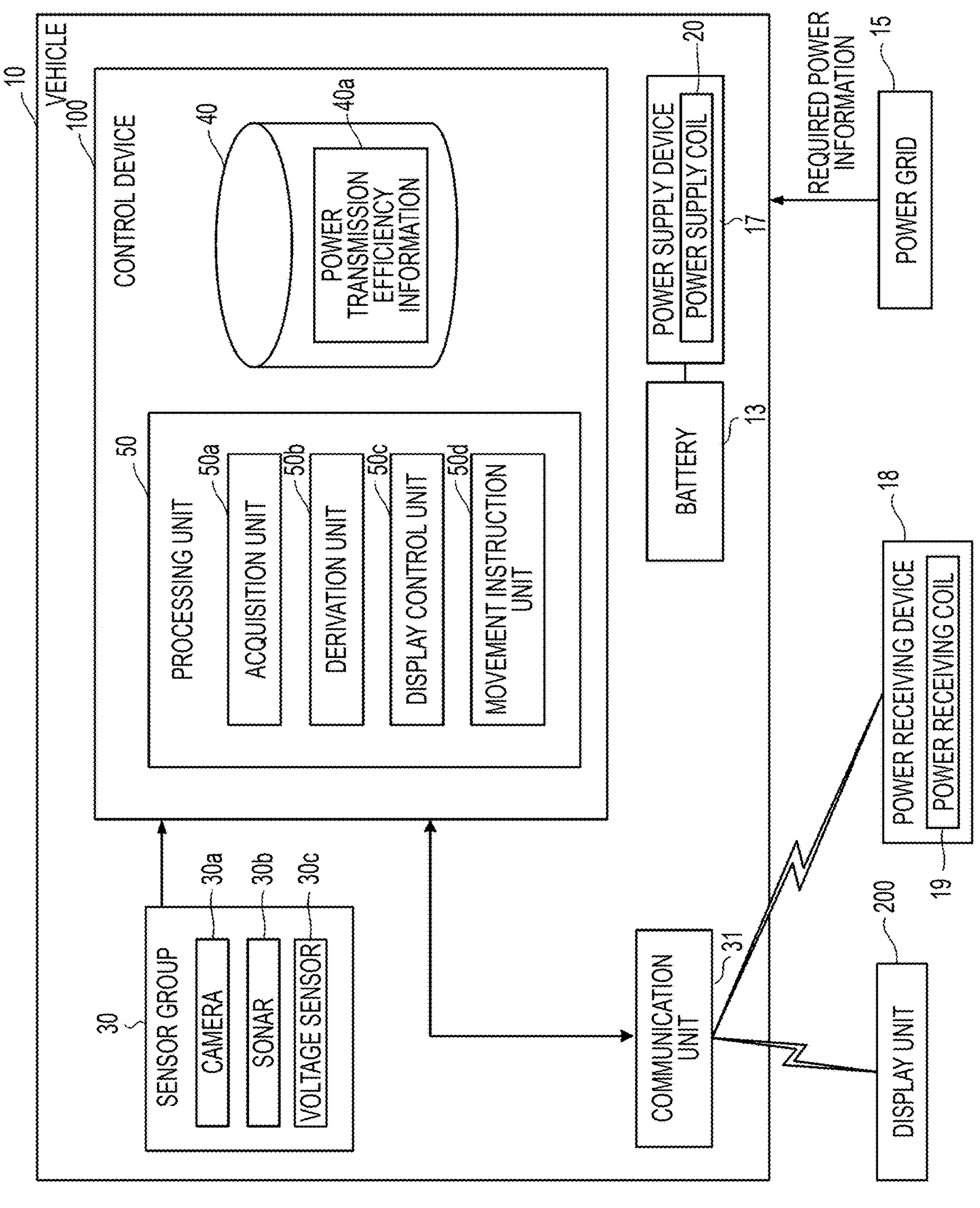
FIG. 3
10
VEHICLE
100
CONTROL DEVICE
40
40a
POWER TRANSMISSION EFFICIENCY INFORMATION
50
PROCESSING UNIT
50a
ACQUISITION UNIT
50b
DERIVATION UNIT
50c
DISPLAY CONTROL UNIT
50d
MOVEMENT INSTRUCTION UNIT
20
POWER SUPPLY DEVICE
POWER SUPPLY COIL
17
BATTERY
13
REQUIRED POWER INFORMATION
15
POWER GRID
18
POWER RECEIVING DEVICE
POWER RECEIVING COIL
19
30
SENSOR GROUP
30a
CAMERA
30b
SONAR
30c
VOLTAGE SENSOR
COMMUNICATION UNIT
31
200
DISPLAY UNIT

CONTROL DEVICE, CONTROL METHOD, AND NON-TRANSITORY COMPUTER-READABLE STORAGE MEDIUM

CROSS-REFERENCE TO RELATED APPLICATIONS

This application is based on and claims priority under 35 USC 119 from Japanese Patent Application No. 2024-028467 filed on Feb. 28, 2024, the entire content of which is incorporated herein by reference.

TECHNICAL FIELD

The present disclosure relates to a control device, a control method, and a non-transitory computer-readable storage medium storing a control program.

BACKGROUND ART

In the related art, there is known a system that exchanges electric power between a vehicle equipped with a battery for traveling and an external device. For example, JP2011-217461A and JP2011-217462A disclose a configuration in which electric power is supplied in a contactless manner from a power supply unit including a primary coil provided in a parking frame of a parking lot to a power reception unit including a secondary coil provided in a vehicle. JP2014-239621A discloses a configuration in which electric power is supplied from a vehicle to an external device.

When exchange of electric power is performed in a contactless manner, for example, as described above, the electric power is exchanged using electromagnetic induction between a coil on a power supply side and a coil on a power receiving side. In this case, normally, in order to improve power supply efficiency (in other words, in order to reduce power supply loss), power supply is performed with relative positions of the coils on the power supply side and the power receiving side being adjusted to positions where a degree of coupling of the coils is high. For example, the power supply is performed with centers of the coils on the power supply side and the power receiving side facing each other. However, when the coils are normally disposed at positions where the degree of coupling is high, for example, the power supply side may not be able to output electric power required by the power receiving side.

SUMMARY OF INVENTION

The present disclosure provides a control device, a control method, and a non-transitory computer-readable storage medium storing a control program, that are capable of increasing a possibility that electric power required by a power receiving side can be output.

A first aspect of the present disclosure relates to a control device that derives a target parking position of an electric vehicle in a parking space, in a case where electric power is exchanged in a contactless manner between the electric vehicle and a power receiving device having a primary coil installed in the parking space and allowed to supply electric power received by the primary coil to a predetermined power grid, the electric vehicle having a secondary coil, the control device including:

an acquisition unit configured to acquire required power information indicating required power, which is a target value of electric power to be supplied to the power grid via the power receiving device; and a derivation unit configured to derive the target parking position based on the acquired required power information and power transmission efficiency information indicating power transmission efficiency at each of position relationships between the primary coil and the secondary coil, in which the derivation unit derives the target parking position at which a second position relationship different from a first position relationship in which the power transmission efficiency is highest is established, according to an amount of the required power.

A second aspect of the present disclosure relates to a control method of a computer that derives a target parking position of an electric vehicle in a parking space, in a case where electric power is exchanged in a contactless manner between the electric vehicle and a power receiving device including a primary coil installed in the parking space and allowed to supply electric power received by the primary coil to a predetermined power grid, the electric vehicle having a secondary coil, the control method including:

acquiring required power information indicating required power, which is a target value of electric power to be supplied to the power grid via the power receiving device; and deriving the target parking position based on the acquired required power information and power transmission efficiency information indicating power transmission efficiency at each of position relationships between the primary coil and the secondary coil, in which the target parking position at which a second position relationship different from a first position relationship in which the power transmission efficiency is highest is established is derived according to an amount of the required power.

A third aspect of the present disclosure relates to a non-transitory computer-readable storage medium storing a control program causing a computer that derives a target parking position of an electric vehicle in a parking space, in a case where electric power is exchanged in a contactless manner between the electric vehicle and a power receiving device including a primary coil installed in the parking space and allowed to supply electric power received by the primary coil to a predetermined power grid, the electric vehicle having a secondary coil, the control program causing the computer to perform:

acquiring required power information indicating required power, which is a target value of electric power to be supplied to the power grid via the power receiving device; and deriving the target parking position based on the acquired required power information and power transmission efficiency information indicating power transmission efficiency at each of position relationships between the primary coil and the secondary coil, in which the target parking position at which a second position relationship different from a first position relationship in which the power transmission efficiency is highest is established is derived according to an amount of the required power.

According to the aspects of the present disclosure, a possibility that electric power required by the power receiving side can be output can be increased.

BRIEF DESCRIPTION OF DRAWINGS

Exemplary embodiment(s) of the present invention will be described in detail based on the following figures, wherein:

FIG. 3 is a block diagram showing a configuration of an electric vehicle equipped with a control device according to the present embodiment;

DESCRIPTION OF EMBODIMENTS

Hereinafter, a control device, a control method, and a non-transitory computer-readable storage medium storing a control program according to an embodiment of the present disclosure will be described with reference to the drawings.

A control device according to the present embodiment is mounted on, for example, an electric vehicle. When participating in a vehicle to grid (V2G) to be described below, the control device performs control to derive a parking position of an electric vehicle for aligning coils in a case where electric power is exchanged (charged and discharged) with respect to an external electric power system in a contactless manner. The electric vehicle is, for example, a vehicle such as an electrical vehicle (EV) or a plug-in hybrid electric vehicle (PHEV) including a chargeable and dischargeable power storage device.

[V2G System]

The V2G in which the electric vehicle can participate is a system in which electric power is exchanged between an electric power system including a commercial electric power grid and the electric vehicle, and when the electric vehicle is not being used as a means of transportation, the power storage device mounted in the electric vehicle is used as a power storage facility. Therefore, bidirectional electric power exchange is performed between the electric vehicle participating in the V2G and the electric power system.

Figure 1:
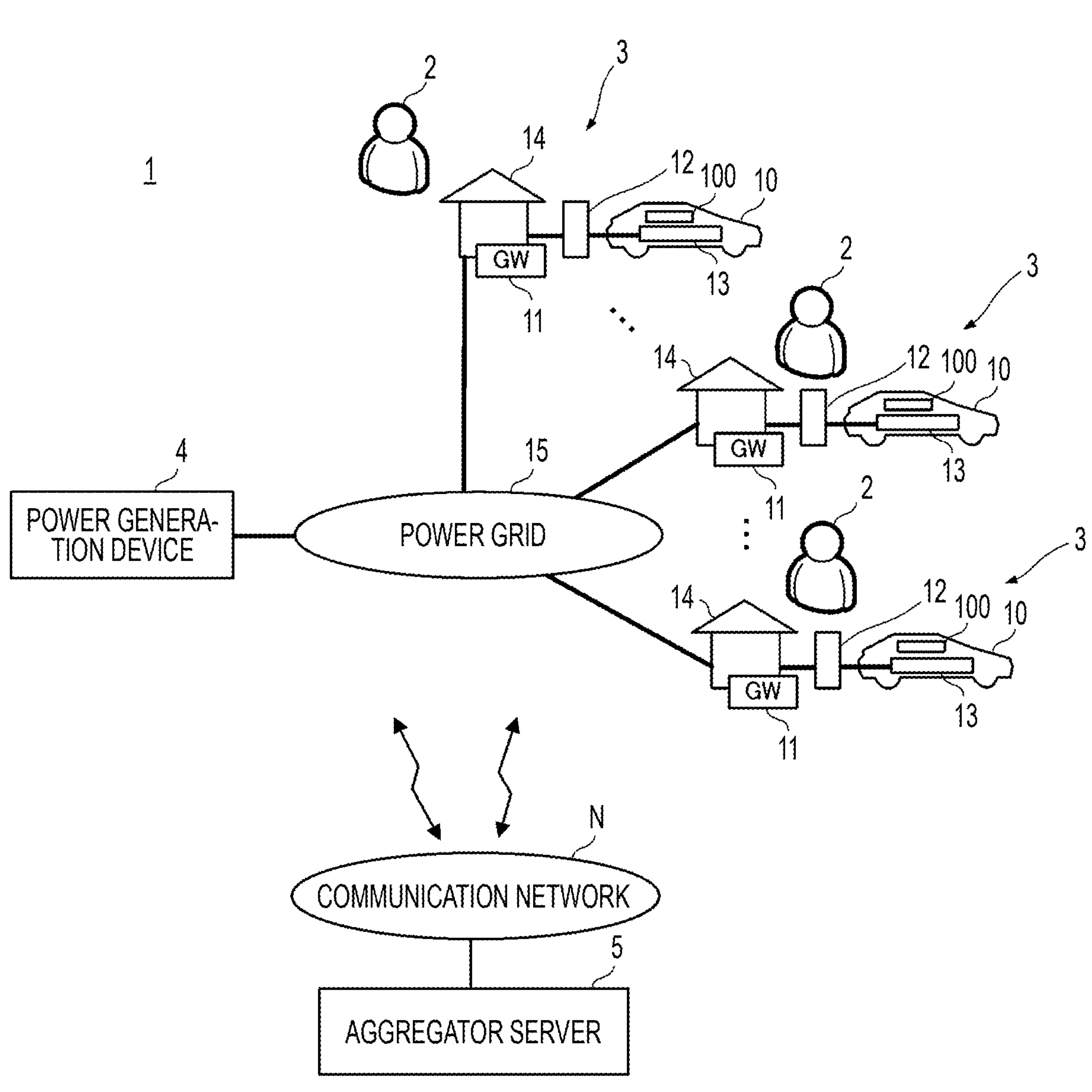
FIG. 1 is a diagram illustrating an example of a V2G system according to the present embodiment.

FIG. 1 is a diagram showing an overall configuration of a V2G system 1. As shown in FIG. 1, the V2G system 1 includes power storage systems 3 that are respectively owned or used by a plurality of customers 2 that use electric power, a power generation device 4, and an aggregator server 5.

Each of the power storage systems 3 includes an electric vehicle 10, a gateway (GW) 11, and a charging and discharging facility 12. The electric vehicle 10 includes a battery 13 that is a power storage device. As described above, the electric vehicle 10 is an electric vehicle such as an EV or a PHEV. The battery 13 is a battery that supplies electric power for traveling of the electric vehicle 10 to a motor (not shown) that is a driving power source. The electric vehicle 10 may be a vehicle owned by an individual, a vehicle used by a business operator for business, a share car, or the like.

The gateway 11 is, for example, installed in a dwelling unit 14 and can communicate with a power grid 15 and the charging and discharging facility 12.

The charging and discharging facility 12 and the power generation device 4 are connected to the power grid 15. The power generation device 4 includes, for example, a power plant that is operated by an electric power company and generates power using energy such as thermal power, wind power, atomic power, or solar light. The electric power generated by the power generation device 4 can be supplied to the charging and discharging facility 12 through the power grid 15. The power grid 15 is, for example, an electric power system.

The charging and discharging facility 12 is provided in the dwelling unit 14, and charges and discharges the battery 13 mounted in the electric vehicle 10. When discharging the battery 13, electric power provided from the battery 13 may be consumed by a power load in the dwelling unit 14 or may be provided to the power grid 15 through a power line installed in the dwelling unit 14. Further, the charging and discharging facility 12 can charge the battery 13 with electric power received from the power grid 15.

When exchanging electric power between the power grid 15 and the battery 13, the electric vehicle 10 and the charging and discharging facility 12 charge and discharge the battery 13 under control of a control device 100 provided in the electric vehicle 10. For example, when power shortage occurs in the power grid 15, the control device 100 can supply electric power from the battery 13 to the power grid 15 by instructing, via the gateway 11, the electric vehicle 10 and the charging and discharging facility 12 to discharge the battery 13. When power surplus occurs in the power grid 15, the control device 100 can reduce the power surplus of the power grid 15 by instructing, via the gateway 11, the electric vehicle 10 and the charging and discharging facility 12 to charge the battery 13. In this way, the control device 100 can use the electric power of the battery 13 mounted in the electric vehicle 10 to provide a power resource for the power grid 15.

The aggregator server 5 is, for example, a server used by a power aggregator. The aggregator server 5 performs power transactions in a power market or the like. The control device 100 communicates with the aggregator server 5 via a communication network N, and provides a necessary amount of electric power from the battery 13 to the power grid 15, or causes the battery 13 to receive (that is, charge) the electric power from the power grid 15. For example, in response to a request from the aggregator server 5, the control device 100 controls the electric vehicle 10 and the charging and discharging facility 12 to discharge the battery 13, and provides electric power corresponding to the request to the power grid 15. Further, in response to a request from the aggregator server 5, the control device 100 may control the electric vehicle 10 and the charging and discharging facility 12 to charge the battery 13, and receive, from the power grid 15, electric power of an amount corresponding to the request. In this way, the electric vehicle 10 equipped with the battery 13 can appropriately control an amount of electric power by charging and discharging.

[Principle of Contactless Power Transmission]

Here, a principle of contactless power transmission will be described. As described above, in the present embodiment, electric power is exchanged between the vehicle and the external electric power system in a contactless manner. Specifically, power transmission is performed in a contactless manner between the electric vehicle 10 and a facility provided in a predetermined parking space 16. In the contactless power transmission, power transmission (contactless charging) from the facility provided in the parking space 16 to the electric vehicle 10 and power transmission (contactless power supply) from the electric vehicle 10 to the facility provided in the parking space 16 are possible. In an example to be described below, description will be made using an example in which the electric vehicle 10 performs contactless power supply for the facility provided in the parking space 16, as the contactless power transmission.

Figure 2:
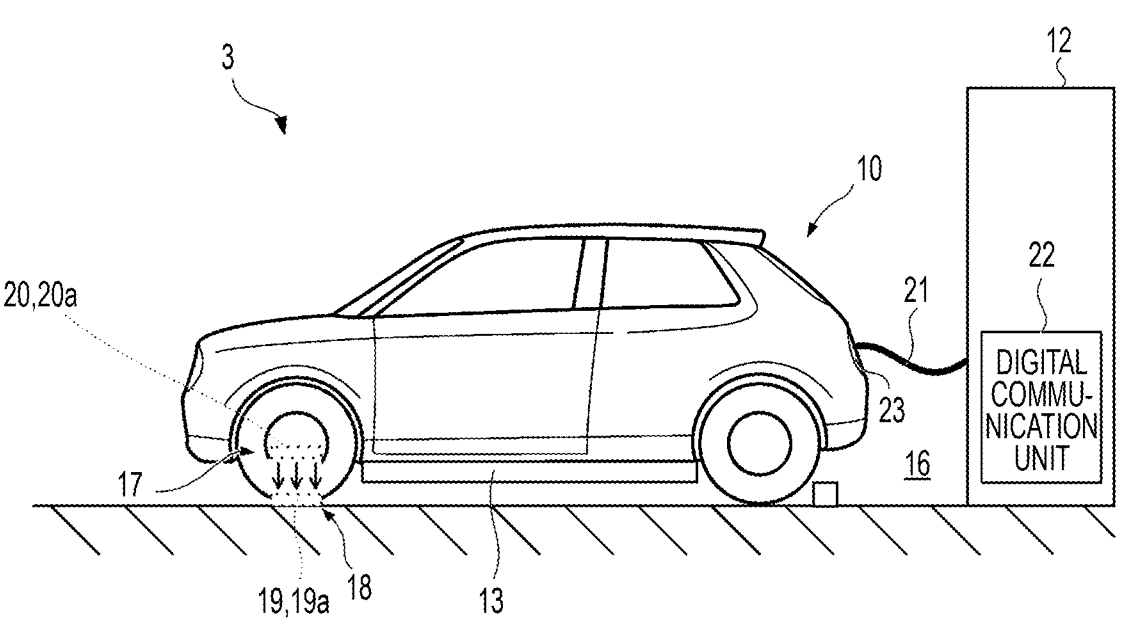
FIG. 2 is a diagram illustrating an example of contactless power transmission, and is a diagram showing a state in which an electric vehicle is parked in a parking space and contactless power supply is being performed.

As shown in FIG. 2, in a system for the contactless power supply, power supply is performed between a power supply device (or power transmission device) 17 that is provided in the electric vehicle 10 and supplies (or transmits) electric power discharged from the battery 13 and a power receiving device 18 that is installed in the predetermined parking space 16 and receives the electric power transmitted from the power supply device 17 in a contactless manner, and the electric power is supplied from the power supply device 17 to the power receiving device 18 using, for example, an electric field resonance method or using magnetic coupling between coils such as a magnetic field resonance method or an electromagnetic induction method. Accordingly, the electric power can be supplied from the electric vehicle 10 to the power grid 15.

The power supply device 17 includes, for example, a power supply coil 20 that is provided under a floor of the electric vehicle 10 in a state of being covered with a pad 20*a* and that supplies DC power, and a power converter (not shown) that converts the supplied electric power from DC power to AC power. A shape of the power supply coil 20 is assumed to be, for example, a circular shape, an elliptical shape, a square shape, or a rectangular shape in a plan view. A size of the power supply coil 20 is assumed to be a size of about several tens of centimeters to several meters on one side when the power supply coil has a rectangular shape, such as a square or a rectangle. In the example shown in FIG. 2, the power supply device 17 is provided under the floor at a vehicle front side of the electric vehicle 10, but may be provided at any position such as at a rear side of the vehicle.

The power receiving device 18 includes, for example, a power receiving coil 19 that is provided on a ground of the parking space 16 in a state of being covered with a pad 19*a* and that receives the electric power transmitted from the power supply device 17 in a contactless manner, and the charging and discharging facility 12. Similar to the power supply coil 20, a shape of the power receiving coil 19 is assumed to be, for example, a circular shape, an elliptical shape, a square shape, or a rectangular shape in a plan view. In the present embodiment, it is assumed that the power receiving coil 19 and the power supply coil 20 have the same shape and size. The power receiving coil 19 corresponds to a "primary coil" in the present disclosure, and the power supply coil 20 corresponds to a "secondary coil" in the present disclosure.

The charging and discharging facility 12 includes a connection unit 21 including a cable and a connector, and a digital communication unit 22. The connection unit 21 exchanges electric power between the charging and discharging facility 12 and the electric vehicle 10 while being connected to an inlet 23 of the electric vehicle 10. The digital communication unit 22 is connected via the gateway 11, and superimposes a signal obtained from the aggregator server 5 on the electric power exchanged between the charging and discharging facility 12 and the electric vehicle 10. Therefore, a control signal from the aggregator server 5 is sent to the electric vehicle 10 as long as the connection unit 21 is connected to the inlet 23 of the electric vehicle 10.

When the electric vehicle 10 is parked at a position where the power supply coil 20 in the power supply device 17 and the power receiving coil 19 in the power receiving device 18 face each other, the electric power is supplied from the power supply coil 20 to the power receiving coil 19, and the contactless power transmission (that is, power supply) is performed.

[Configuration of Electric Vehicle]

Next, a configuration of the electric vehicle 10 including the control device 100 will be described. As shown in FIG. 3, the electric vehicle 10 includes a sensor group 30, a communication unit 31, the battery 13, the control device 100, and the power supply device 17.

The sensor group 30 acquires, for example, various detection values used by the control device 100 to perform parking control and the like. The sensor group 30 includes, for example, a camera 30*a*, a sonar 30*b*, and a voltage sensor 30*c*.

The camera 30*a* acquires recognition data (for example, a peripheral image) for recognizing external environment of the electric vehicle 10 by imaging a periphery of the electric vehicle 10. The camera 30*a* includes, for example, a front camera, a rear camera, a left side camera, and a right side camera, and captures a front image, a rear image, a left side image, and a right side image as the peripheral image. The number of cameras 30*a* may be any number, and for example, the left side camera and the right side camera may not be provided.

The sonar 30*b* emits a sound wave to the periphery of the electric vehicle 10, and receives a reflected sound from another object. A plurality of sonars 30*b* are provided, for example, in front, rear, left, and right sides of the electric vehicle 10.

The voltage sensor 30*c* detects a voltage value of the battery 13 (hereinafter referred to as a battery voltage).

Although not shown, the sensor group 30 may include a temperature sensor of the battery 13, a radar, a LIDAR, a vehicle speed sensor, a wheel speed sensor, and the like.

The communication unit 31 is a communication interface that communicates with an external device under control performed by the control device 100. The control device 100 can communicate with the power receiving device 18, the power grid 15, a display unit 200, the charging and discharging facility 12, the aggregator server 5, and the like via the communication unit 31. The display unit 200 is a display or the like that displays a target parking position derived by the control device 100, and is assumed to be, for example, a display of a portable terminal owned by a user such as an occupant or an owner of the electric vehicle 10 (hereinafter, simply referred to as a user) or a display in a navigation device (not shown) mounted in the electric vehicle 10. In the present embodiment, the display unit 200 is assumed to be an external display such as a portable terminal.

The battery 13 is a chargeable and dischargeable power storage device, and is implemented by, for example, a secondary battery such as a lithium ion battery or a nickel-metal hydride battery, a capacitor, or an all-solid-state battery. The battery 13 can supply electric power stored in a motor (not shown) that is the driving power source of the electric vehicle 10, and can store electric power supplied from the charging and discharging facility 12 and electric power regenerated by the motor.

The control device 100 includes a storage unit 40 and a processing unit 50. The storage unit 40, as a non-transitory computer-readable storage medium, stores power transmission efficiency information 40*a* indicating power transmission efficiency, and various types of other data and various programs.

The power transmission efficiency information 40*a* is information indicating the power transmission efficiency for each position relationship between the power supply coil 20 and the power receiving coil 19. For example, the power transmission efficiency information 40*a* includes information indicating a "Q value" indicating coil quality of the power supply coil 20 and the power receiving coil 19, and information indicating "k" which is a coupling coefficient for each position relationship between the power supply coil 20 and the power receiving coil 19. The power transmission efficiency information 40*a* may be information indicating a product "kQ" of "k" and the Q value for each position relationship between the power supply coil 20 and the power receiving coil 19. In the present embodiment, as the power transmission efficiency information 40*a*, a kQ map in which information indicating the kQ for each position relationship between the power supply coil 20 and the power receiving coil 19 is mapped is stored in the storage unit 40.

Figure 4:
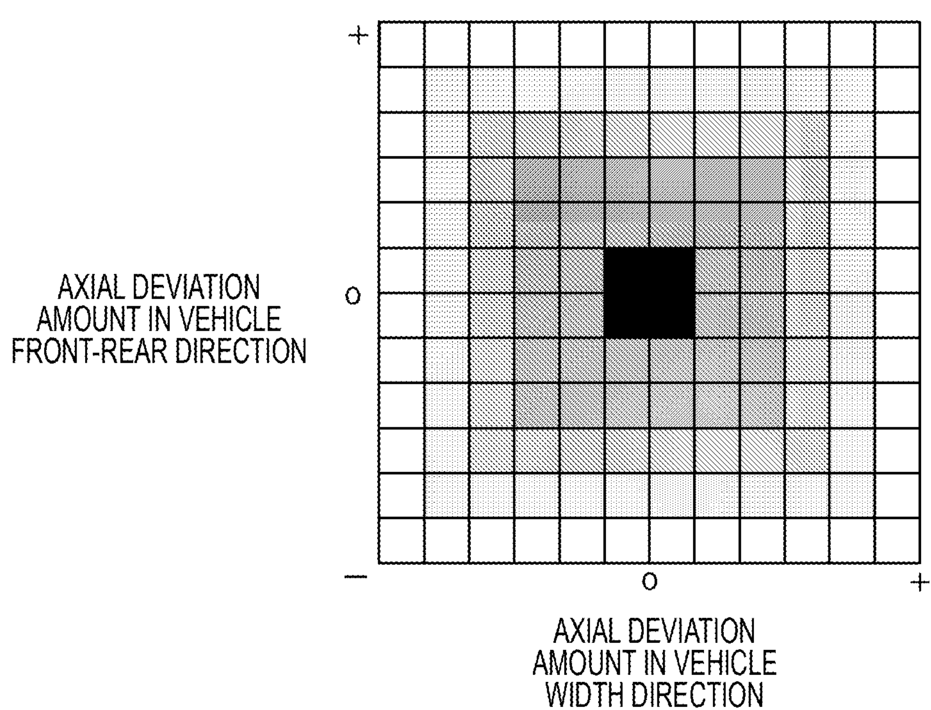
FIG. 4 is a diagram showing an example of a kQ map.

FIG. 4 is a diagram showing an example of the kQ map, in which a vertical axis indicates an axial deviation amount that is a deviation between a center of the power receiving coil 19 and a center of the power supply coil 20 in a vehicle front-rear direction (hereinafter also referred to as an axial deviation amount), and a horizontal axis indicates the axial deviation amount in a vehicle width direction. In the example of FIG. 4, an unhatched position (cell) or a range in a central portion shown in black indicates kQ in a case where the coil centers of the power receiving coil 19 and the power supply coil 20 face each other (or substantially face each other), and the position is a position where the kQ is highest. That is, in the unhatched position or range shown in black, the axial deviation amount in the vehicle front-rear direction and the axial deviation amount in the vehicle width direction are "0" (or substantially close to "0").

Further, the kQ decreases in a stepwise manner from the unhatched position or range shown in black toward the outside. That is, the kQ decreases as an absolute value of the axial deviation amount in at least one of the vehicle front-rear direction and the vehicle width direction increases. In the example shown in FIG. 4, the kQ is the same at positions indicated by the same hatching. A specific calculation method of the kQ will be described later.

The processing unit 50 includes, for example, a CPU, a RAM, and a ROM. The processing unit 50 executes various programs stored in the storage unit 40 or the ROM. In the related-art contactless power transmission, in order to improve power supply efficiency (in other words, in order to reduce power supply loss), relative positions of coils on a power supply side and a power receiving side are adjusted to positions where a degree of coupling between the coils is high. For example, centers of the coils on the power supply side and the power receiving side are face each other. Meanwhile, when the coils are disposed at positions where the degree of coupling is high, for example, it may not be able to output electric power required by the power receiving side.

Figure 5:
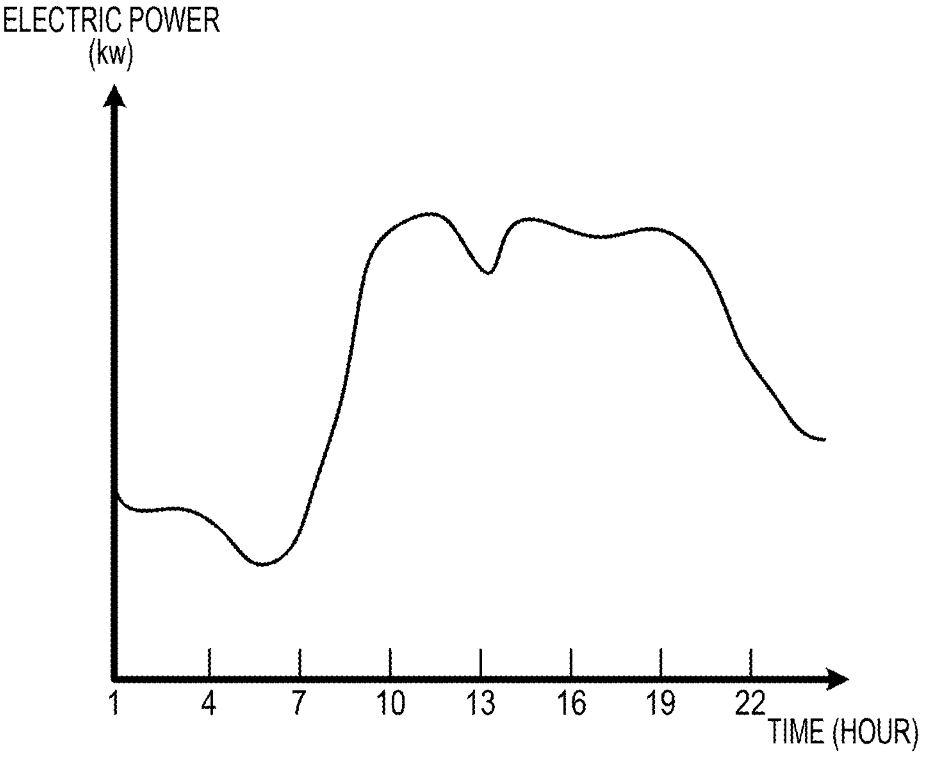
FIG. 5 is a diagram showing an example of required power information.

Specifically, when the electric vehicle 10 participates in the V2G, the electric vehicle 10 may not be able to output required power of the power grid 15 which is on the power receiving side. The required power changes in time series in response to a balance between demand and supply of the customers 2. FIG. 5 is a diagram showing an example of a time series transition of required power in a predetermined period (for example, 24 hours) required by the power grid 15 (corresponding to required power information of the present disclosure), as can be seen from FIG. 5, for example, the power demand is smaller in a time period from about 1:00 to about 7:00 than in other time periods. Meanwhile, in a time period from about 10:00 to about 19:00, the power demand is larger than in other time periods. That is, in a time period for which activities of people increase, the supply of electric power from the power grid 15 to the customers 2 becomes insufficient, and the required power increases. On the other hand, in a time period for which the activities of people decrease, the supply of electric power from the power grid 15 to the customers 2 becomes excessive, and the required power decreases. In this way, magnitude of the electric power required by the power receiving side transitions. Accordingly, when the positions of the coils on the power supply side and the power receiving side are normally set to positions where the degree of coupling is high, electric power output from the power supply side may be, for example, larger than electric power required by the power receiving side. That is, the electric power required by the power receiving side cannot be output. Therefore, in the present embodiment, the control device 100 is configured to, in order to prevent a situation in which the electric power required by the power receiving side cannot be output (in other words, in order to increase a possibility that the required power can be output), derive the target parking position of the electric vehicle 10 in the parking space 16 such that the positions of the coils can be adjusted to positions corresponding to the electric power required by the power receiving side.

Specifically, the processing unit 50 executes a program for deriving the target parking position of the electric vehicle 10 in the parking space 16, as an example of a program recorded in the storage unit 40. When the program is executed, the processing unit 50 functions as an acquisition unit 50*a*, a derivation unit 50*b*, a display control unit 50*c*, and a movement instruction unit 50*d*. In the following description, processing performed by the acquisition unit 50*a*, the derivation unit 50*b*, the display control unit 50*c*, and the movement instruction unit 50*d* are processing implemented by the processing unit 50.

The acquisition unit 50*a* acquires the required power information indicating the required power that is a target value of electric power to be supplied to the power grid 15 via the power receiving device 18. Specifically, the acquisition unit 50*a* acquires, from the power grid 15, information indicating the time series transition of the required power during the predetermined period described above with reference to FIG. 5. Further, the acquisition unit 50*a* may periodically acquire the required power information from the power grid 15, store the required power information into the storage unit 40, and acquire the required power information by referring to the storage unit 40 when there is a power supply request from the user of the electric vehicle 10.

The derivation unit 50*b* derives the target parking position of the electric vehicle 10 in the parking space 16 based on the required power information acquired by the acquisition unit 50*a* and the power transmission efficiency information (that is, the kQ map) 40*a* indicating the power transmission efficiency for each position relationship between the power receiving coil 19 and the power supply coil 20. Specifically, the derivation unit 50*b* derives the target parking position of the electric vehicle 10 in the parking space 16 according to the required power from the power grid 15, by referring to the above-described kQ map of FIG. 4 stored in advance in the storage unit 40. That is, according to the required power from the power grid 15, the derivation unit 50*b* derives a position of the power supply coil 20 facing the center of the power receiving coil 19 based on the axial deviation amount in the kQ map, and derives the target parking position of the electric vehicle 10 based on the derived position. At this time, the derivation unit 50*b* may derive the position of the power supply coil 20 having a position relationship different from the position relationship in which the power transmission efficiency is the highest (that is, the position relationship in which the center of the power receiving coil 19 and the center of the power supply coil 20 face each other) depending on the required power from the power grid 15. That is, in the present embodiment, a position different from the coil center where the power transmission efficiency is the highest may be derived as the target parking position. The position relationship in which the center of the power receiving coil 19 and the center of the power supply coil 20 face each other corresponds to a "first position relationship in which power transmission efficiency is highest" in the present disclosure. The position relationship in which the center of the power receiving coil 19 and a portion other than the center of the power supply coil 20 face each other according to the required power corresponds to a "second position relationship" in the present disclosure.

The required power of the power grid 15 transitions in time series as described above, and the electric power supplied from the electric vehicle 10 may also change depending on a remaining charge amount of the battery 13 or the like, and thus the electric power required by the power grid 15 may not be able to be output in all the time periods. Therefore, for example, the derivation unit 50*b* derives, as the target parking position, a position at which a period for which the required power of the power grid 15 is satisfied takes a predetermined ratio or more with respect to a predetermined period (for example, 24 hours). Further, the derivation unit 50*b* may derive, as the target parking position, a position at which the period for which the required power of the power grid 15 is satisfied is longest.

The display control unit 50*c* displays, on the predetermined display unit 200, the target parking position of the electric vehicle 10 derived by the derivation unit 50*b*. That is, in order to notify the derived target parking position to the user of the electric vehicle 10, the display control unit 50*c* transmits, via the communication unit 31, information on the target parking position to a portable terminal or the like on which the display unit 200 is mounted, and displays the target parking position on the display unit 200.

The movement instruction unit 50*d* instructs the electric vehicle to automatically move to the target parking position derived by the derivation unit 50*b*. That is, an instruction for moving the electric vehicle 10 to the target parking position displayed on the display unit 200 is given to the electric vehicle 10. The control for automatically parking the electric vehicle 10 to the target parking position may be various known methods in the related art. For example, the control device 100 controls a steering device, the motor as the driving power source, a brake device, and the like (not shown) to park the electric vehicle 10 to the target parking position displayed on the display unit 200. At the time of the automatic parking, the control device 100 automatically moves and parks the electric vehicle 10 to the target parking position in the parking space 16 based on external recognition data or the like acquired by the camera 30*a* or the sonar 30*b*.

[Example of Control of Deriving Target Parking Position by Control Device]

Next, a specific control example of deriving the target parking position of the electric vehicle 10 in the parking space 16 will be described. As described above, the control device 100 derives the target parking position based on the required power of the power grid 15 and the kQ including the coupling coefficient between the power receiving coil 19 and the power supply coil 20.

Specifically, the control device 100 acquires the required power information that is the required power of the power grid 15 by a function of the acquisition unit 50*a*. As means for acquiring the required power information, the required power information may be acquired by communicating with the power grid 15 every time the target parking position is derived as described above, or the required power information may be acquired periodically from the power grid 15, stored in the storage unit 40, and acquired by referring to the storage unit 40.

Further, the control device 100 acquires a voltage V1 in the power supply device 17, a voltage V2 in the power receiving device 18, and the kQ map. The voltage V1 in the power supply device 17 is, for example, a voltage of the battery 13, and the control device 100 acquires a voltage value input from the voltage sensor 30*c* to the control device 100 by a function of the derivation unit 50*b*. The voltage V2 in the power receiving device 18 is a voltage (for example, 100V in Japan) based on a region (a voltage determined in each country or each region) in which the power receiving device 18 is installed, and the control device 100 acquires the voltage V2 by communicating with the power receiving device 18. Further, since the voltage V2 is a value determined in advance for each region, the voltage can be said to be a fixed value, and thus the control device 100 may acquire the voltage V2 without communicating with the power receiving device 18.

As described above, the kQ map is determined by the product of the coupling coefficient "k" between the power receiving coil 19 and the power supply coil 20, and the "Q value" that is the quality of the coil. Since the "Q" in the kQ is a fixed value determined in advance according to the quality of the coil, it can be said that the kQ is substantially determined by the coupling coefficient "k". Then, the coupling coefficient "k" is determined according to, for example, a distance in a height direction between the power receiving coil 19 and the power supply coil 20, an axial deviation amount (axial deviation distance) which is a deviation between the center of the power receiving coil 19 and the center of the power supply coil 20, or the like. That is, as the distance in the height direction between the power receiving coil 19 and the power supply coil 20 decreases and the axial deviation amount in a horizontal direction decreases, a relative distance between the power receiving coil 19 and the power supply coil 20 decreases, and an amount of electric power that can be supplied and the power transmission efficiency are maximized. In other words, the amount of electric power that can be supplied and the power transmission efficiency change in response to the relative distance between the power receiving coil 19 and the power supply coil 20. Although a vehicle height may vary depending on a vehicle model, the distance in the height direction between the power receiving coil 19 and the power supply coil 20 is uniquely determined for each vehicle model and may be regarded as a fixed value. Accordingly, it can be said that the coupling coefficient "k" substantially determines the amount of electric power that can be supplied and the power transmission efficiency according to the axial deviation amount in the horizontal direction. The horizontal direction includes the vehicle front-rear direction and the vehicle width direction.

In the present embodiment, the position of the power supply coil 20 facing the center of the power receiving coil 19 is determined using the kQ according to the required power of the power grid 15, and the target parking position of the electric vehicle 10 is derived based on the determined position.

Here, a method for calculating the kQ for each position (each cell) in the kQ map will be described. The kQ for each position is determined in advance by, for example, experiments. Specifically, for example, the coil center of the power supply coil 20 and the coil center of the power receiving coil 19 face each other such that the axial deviation amount is "0" (or substantially "0"), and the kQ at the position is calculated. Then, with reference to a state in which the coil centers face each other, the coil centers are shifted by any amount in the vehicle front-rear direction (vertical direction) and the vehicle width direction (lateral direction) (that is, the axial deviation amount is set to any amount). Then, the kQ is calculated for a position where the coil center is shifted by any amount. Similar processing is executed for all positions, and the kQ is calculated for all the positions. When the kQ is calculated for all the positions, mapped data as shown in FIG. 4 is generated, and the generated data is transmitted to the control device 100. The control device 100 that receives the data stores the data as the power transmission efficiency information 40*a* into the storage unit 40. Then, the control device 100 acquires the kQ, that is based on the axial deviation amount, by referring to the storage unit 40 by the function of the derivation unit 50*b*. As for the kQ to be calculated, for example, as in the map shown in FIG. 4, when there is regularity such as "the kQ is the same for positions shifted by the same amount from a state in which the coil centers face each other", it may be considered that the kQ is calculated for all the positions by calculating the kQ for a plurality of any positions without calculating the kQ for all the positions. For example, in addition to being determined in advance by experiments or the like, the kQ map may be obtained by acquiring data in the progress of parking the electric vehicle 10 in the parking space 16, mapping the data by accumulating the acquired data, and storing the mapped data in the storage unit 40.

The derivation unit 50*b* acquires the electric power that can be output at each position of the power supply coil 20, based on the acquired parameters (the voltage V1, the voltage V2, and the kQ at each position). Here, the electric power that can be output at each position of the power supply coil 20 indicates the electric power that can be output at each position when each position of the power supply coil 20 faces the center of the power receiving coil 19. As described above, since the kQ may change according to the axial deviation amount between the coil centers, the electric power that can be output (in other words, electric power that can be supplied) changes according to the axial deviation amount, but the electric power that can be output may change according to the values of the voltage V1 and the voltage V2. In particular, among the acquired parameters, the voltage V1 in the power supply device 17 is a battery voltage, and thus changes according to the remaining charge amount of the battery 13. In other words, the voltage V1 can change in time series. Therefore, a time series transition of the electric power that can be output is acquired for each position of the power supply coil 20. For example, the derivation unit 50*b* predicts the remaining charge amount of the battery 13 based on consumption of the battery 13 due to power supply from the battery 13 or traveling, and predicts a time series transition of the voltage V1 in the power supply device 17 based on the prediction. Then, based on the predicted voltage V1, the voltage V2, and the kQ for each position of the power supply coil 20, the time series transition of the electric power that can be output is acquired for each position of the power supply coil 20. The acquired time series transition of the electric power is an actual value that can be supplied from the electric vehicle 10 (hereinafter, also simply referred to as an actual value). The actual value is represented by, for example, data similar to the time series transition of the required power described in FIG. 5.

The derivation unit 50*b* compares the actual value that can be supplied from the electric vehicle 10 with a required value that is the required power of the power grid 15 (hereinafter, also simply referred to as a required value) for each position of the power supply coil 20. That is, by performing the comparison, it is possible to determine how much the request can be satisfied with respect to the required power that changes in time series, for each position of the power supply coil 20. Then, based on such a comparison, the derivation unit 50*b* acquires, for each position of the power supply coil 20, a position at which a period for which the required power is satisfied takes a predetermined ratio or more. As described above, the required power of the power grid 15 transitions in time series, and the electric power supplied from the electric vehicle 10 also changes depending on the remaining charge amount of the battery 13 or the like, and thus the electric power required by the power grid 15 may not be able to be output in all the time periods. Therefore, for example, the derivation unit 50*b* acquires (that is, extracts), from among the positions of the power supply coil 20, a position at which a period for which the required power of the power grid 15 is satisfied takes a predetermined ratio or more with respect to a predetermined period (for example, 24 hours).

The position of the power supply coil 20 acquired in this manner is different from a position in contactless power transmission using electromagnetic induction, which is known in the related art. That is, in a known example in the related art, in order to maximize the power transmission efficiency, the center of the coil on the power supply side and the center of the coil on the power receiving side face each other, but in the present embodiment, the position at which the power supply coil 20 faces the center of the power receiving coil 19 may be offset from the center of the power supply coil 20. In other words, a position relationship different from the position relationship in which the power transmission efficiency is highest may be acquired according to the required power. Then, the control device 100 derives the target parking position of the electric vehicle 10 based on the acquired position of the power supply coil 20.

A plurality of positions may be derived as the position at which a period for which the required power is satisfied takes a predetermined ratio or more. In this case, any one of the plurality of positions may be set as the target parking position. For example, the control device 100 derives, as the target parking position, a position at which a movement amount from the position when the coil centers face each other is small.

[Example of Processing Performed by Control Device]

Figure 6:
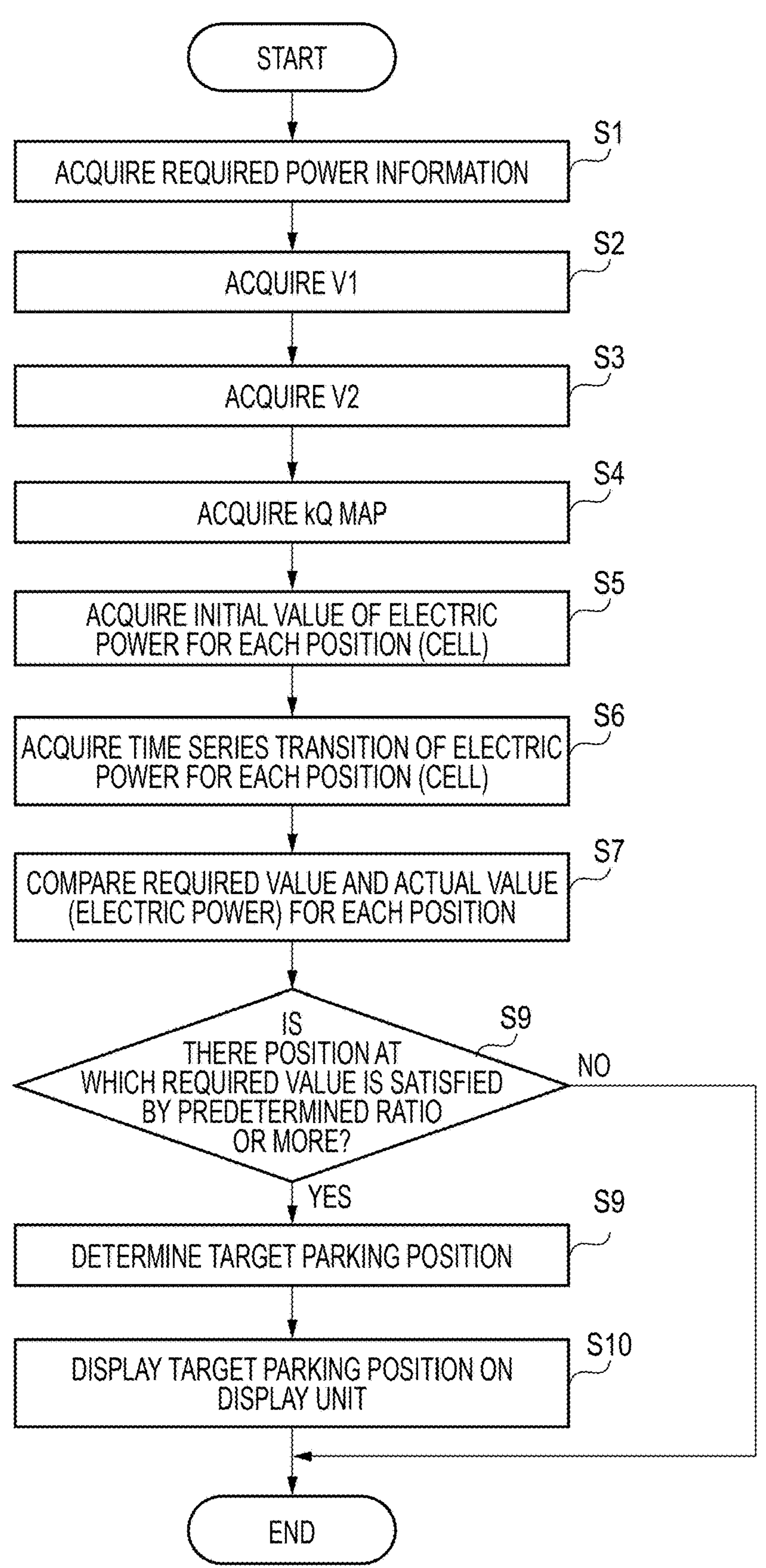
FIG. 6 is a flowchart showing an example of processing of deriving a target parking position.

Next, an example of the processing performed by the control device 100 will be described with reference to a flowchart. FIG. 6 is a flowchart showing an example of the processing, and the processing is performed, for example, when there is a power supply request from the user of the electric vehicle 10. The power supply request is, for example, input by executing a predetermined application by the user or input by operating the display unit 200 or the display of the navigation device in the electric vehicle 10.

When the power supply request is made by the user, the control device 100 acquires the required power information (step S1). That is, the control device 100 acquires, by the function of the acquisition unit 50*a*, the required power information described with reference to FIG. 5 from the power grid 15.

The control device 100 acquires the voltage V1 of the power supply device 17 (step S2). That is, the control device 100 acquires the battery voltage detected by the voltage sensor 30*c*, by the function of the derivation unit 50*b*. When the voltage V1 of the power supply device 17 is acquired, the control device 100 causes the processing to proceed to step S3.

In step S3, the control device 100 acquires the voltage V2 of the power receiving device 18. That is, the control device 100 communicates with the power receiving device 18 to acquire the voltage V2 in the power receiving device 18, by the function of the derivation unit 50*b*. When the voltage V2 in the power receiving device 18 is acquired, the control device 100 causes the processing to proceed to step S4.

In step S4, the control device 100 acquires the kQ map. That is, the control device 100 acquires the kQ for each position relationship between the power supply coil 20 and the power receiving coil 19 by referring to the power transmission efficiency information 40*a* stored in the storage unit 40, by the function of the derivation unit 50*b*.

Since the parameters such as the required power, the voltage V1, the voltage V2, and the kQ are independent values, an order of the processing in step S1 to step S4 described above is not limited to this order. That is, step S1 to step S4 may be performed in any order, or may be performed simultaneously.

The control device 100 acquires an initial value (current value) of the electric power for each position of the power supply coil 20 (step S5). That is, the control device 100 acquires, by the function of the derivation unit 50*b*, the electric power that can be output at each position of the power supply coil 20, based on the voltage V1, the voltage V2, and the kQ acquired in step S2 to step S4. The initial value referred to herein is defined based on the fact that the electric power may change in step S6 to be described later. That is, since the electric power that can be output at each position of the power supply coil 20 transitions in time series depending on the battery voltage (voltage V1) as described above, the initial value is defined to be separated from the electric power that transitions.

The control device 100 acquires the time series transition of the electric power at each position of the power supply coil 20 (step S6). That is, by the function of the derivation unit 50*b*, the control device 100 predicts a transition of the voltage V1 of the power supply device 17 based on the remaining charge amount of the battery 13, and acquires the time series transition (actual value) of the electric power at each position of the power supply coil 20 based on the prediction.

The control device 100 compares the required power (required value) that is based on the required power information acquired in step S1 with the actual value for each position of the power supply coil 20 acquired in step S6, by the function of the derivation unit 50*b* (step S7). Regarding the actual value set for each position of the power supply coil 20, as described above, the electric power that can be output is shown in time series similarly to the required power information of FIG. 5. The control device 100 refers to the required value and the actual value shown in the same manner, and determines how much the required value and the actual value match. After comparing the actual value with the required value in step S7, the control device 100 causes the processing to proceed to step S8.

In step S8, the control device 100 determines whether there is a position of the power supply coil 20 at which the required value is satisfied by a predetermined ratio or more. That is, the control device 100 determines, by the function of the derivation unit 50*b*, whether there is a position of the power supply coil 20 at which the required value is satisfied by a predetermined ratio or more in the required value and the actual value compared in step S7. The predetermined ratio may be determined in advance, for example, on the power receiving side, for example, as shown in FIG. 5, when a predetermined time (24 hours) is divided into eight time periods each being 3 hours, a position at which the request is satisfied in five or more time periods is determined as the position of the power supply coil 20 at which the required value is satisfied by the predetermined ratio or more.

In step S8, when it is determined that there is a position of the power supply coil 20 at which the required value is satisfied by a predetermined ratio or more (Yes in step S8), the control device 100 determines the target parking position of the electric vehicle 10 based on the determined position of the power supply coil 20, by the function of the derivation unit 50*b* (step S9). That is, the control device 100 derives the target parking position facing the position of the power supply coil 20 determined in step S9, as the position of the power supply coil 20 facing the center of the power receiving coil 19. When the target parking position of the electric vehicle 10 is determined in this manner, the control device 100 causes the processing to proceed to step S10.

In step S10, the control device 100 displays the target parking position determined in step S9 on the display unit 200, by a function of the display control unit 50*c*. That is, the control device 100 transmits information on the determined target parking position to a portable terminal or the like of the user including the display unit 200, and displays the target parking position on the display unit 200.

In this way, when the target parking position is displayed on the display unit 200, the user automatically or manually moves the electric vehicle 10 to the target parking position. For example, when the electric vehicle 10 is automatically moved to the target parking position, the control device 100 instructs the electric vehicle 10 to automatically move to the target parking position, by a function of the movement instruction unit 50*d*. For example, the electric vehicle 10 that receives the instruction controls the steering device, the motor that is the driving power source, the brake device, and the like based on the external recognition data acquired by the camera 30*a*, the sonar 30*b*, and the like, and moves the electric vehicle 10 to the target parking position displayed in step S10. As the external recognition data, for example, recognition data related to an obstacle such as a white line defining the parking space 16, an outer wall, or a curb, and recognition data related to the power receiving coil 19 provided in the parking space 16, or the like are assumed.

When the user manually moves the electric vehicle 10 to the target parking position, the user himself/herself operates the steering device, an accelerator pedal, a brake pedal, and the like based on the external recognition data acquired by the camera 30*a*, the sonar 30*b*, and the like, for example, to move the electric vehicle 10 to the target parking position.

After performing the processing in step S10, the control device 100 ends the processing in the flowchart shown in FIG. 6. Further, in step S8 described above, even when it is determined that there is no position of the power supply coil 20 at which the required value is satisfied by a predetermined ratio or more (No in step S8), the control device 100 ends the processing in the flowchart shown in FIG. 6. In this case, by the function of the display control unit 50*c*, the control device 100 may notify the display unit 200 that there is no position of the power supply coil 20 at which the required value is satisfied by a predetermined ratio or more.

As described above, in the present embodiment, the position of the power supply coil 20 of the power supply device 17 facing the power receiving coil 19 of the power receiving device 18 is determined based on the power transmission efficiency (kQ) according to the amount of the required power, and the target parking position of the electric vehicle 10 is derived based on the determined position of the power supply coil 20. At the target parking position, a second position relationship different from the first position relationship in which the power transmission efficiency is highest is established. That is, by adjusting the position of the power supply coil 20, an optimum target parking position corresponding to the required power can be derived. Accordingly, for example, as compared with a case where the target parking position is derived based on a position at which the power transmission efficiency of the coils of the power supply device and the power receiving device is the highest without exception, a possibility that the required power is satisfied can be increased.

In this way, it is possible to respond to the required power by adjusting the position of the power supply coil 20, and thus an increase in cost can be prevented as compared with a case where a mechanism, a device, or the like capable of adjusting the electric power is separately provided in order to respond to the required power, for example. The electric power can be adjusted by an inverter or the like, but an adjustment width is limited.

Since the electric power corresponding to the required power can be output in this manner, for example, a possibility that the number of users participating in the V2G increases can be increased.

In the present embodiment, the control device 100 is configured to display the derived target parking position on the predetermined display unit 200. Therefore, the user of the electric vehicle 10 can grasp the target parking position corresponding to the required power, by viewing the display unit 200.

In the present embodiment, the control device 100 is configured to automatically move the vehicle to the derived target parking position. Therefore, for example, the user can save the trouble of moving the electric vehicle 10 to the target parking position by himself/herself. Further, in such movement to the target parking position, since a size of the coil is several millimeters to several tens of millimeters as described above and is relatively small (for example, as compared with a size of the electric vehicle 10), an operation technique is required to manually move to the target parking position. Meanwhile, in the present embodiment, since the vehicle can be automatically parked at the target parking position, even a user who does not have such operation techniques and is not good at parking can park at the target parking position.

Further, the control device 100 derives, as the target parking position, a position of the power supply coil 20 at which a period for which the required power is satisfied takes a predetermined ratio or more of a predetermined period (for example, 24 hours). Therefore, for example, the number of candidates of the target parking position to be derived can be increased as compared with a case where a position at which the required power is satisfied in all the periods is derived as the target parking position.

Further, since the power transmission efficiency described above is based on the coupling coefficient "k" between the power receiving coil 19 and the power supply coil 20, and the Q value indicating the quality of the coil, the target parking position can be easily derived as compared with a case where the target parking position is derived using, for example, other data that is not mapped or a separate device.

Modification

The above-described embodiment may be modified as follows. In the above-described embodiment, the control device 100 is configured to acquire the electric power that can be output for each position of the power supply coil 20 and derive the target parking position based on the acquired electric power at each position and the required power. On the other hand, the power grid 15 may require power responsiveness in addition to the required power. Normally, the responsiveness decreases as the electric power output from the power supply device increases (in other words, the responsiveness improves as the output electric power decreases). Therefore, for example, when a position where the centers of the coils having a high coupling coefficient face each other is set as the target parking position, there is a possibility that the power responsiveness required by the power grid 15 is not satisfied. The request for the responsiveness may also change in time series similarly to the required power information shown in FIG. 5. Accordingly, the control device 100 may acquire a position at which the required power and the required responsiveness are satisfied in consideration of the power responsiveness at each position of the power supply coil 20, and derive the target parking position of the electric vehicle 10 based on the acquired position.

In this way, by deriving the target parking position considering the power responsiveness in addition to the required power, it is possible to respond to the request on the request side (that is, the power grid 15). Although the power responsiveness is considered in addition to the required power, only the power responsiveness may be used as the required value.

Further, the control device 100 may use, as the parameter for deriving the target parking position of the electric vehicle 10, the power supply efficiency that is a ratio of the electric power received by the power receiving device 18 to the electric power output from the power supply device 17, instead of the electric power at each position of the power supply coil 20.

Further, the control device 100 may use, as the parameter for deriving the target parking position of the electric vehicle 10, the electric power at each position of the above-described power supply coil 20, the power responsiveness, and the power supply efficiency. In this case, as the derived target parking position, a target parking position comprehensively considering these parameters is derived.

In the above-described embodiment, a position of the power receiving coil 19 of the power receiving device 18 facing the power supply coil 20 is described as the coil center, the facing position may be a position other than the coil center. This is because, for example, depending on a place where the power receiving device 18 is installed or the like, the coil center may be located on an end portion side of the installation place, and there is a possibility that a facing position other than the coil center (for example, an end portion side of the coil) faces the power supply coil 20 more easily.

In the above-described embodiment, the order of a part of the processing may be changed or omitted. For example, although the control device 100 acquires the initial value of the electric power for each position of power supply coil 20 in step S5 described above, the processing in step S5 may be omitted when the initial value can be acquired in step S6 of acquiring the time series transition of the electric power. Further, as described above, the processing in step S1 to step S4 may be changed in order or may be performed simultaneously.

Further, in the above-described embodiment, when a negative determination is made in step S8, that is, when the required value is not satisfied by the predetermined ratio or more, the processing in the flowchart in FIG. 6 is ended, but in this case, for example, instead of ending the processing, the target parking position may be derived based on a position at which the required value is most satisfied for each position of the power supply coil 20.

[Others]

Although each of the embodiments has been described above with reference to the drawings, it is needless to say that the present invention is not limited to the embodiments. It is apparent that those skilled in the art can conceive of various modifications and changes within the scope described in the claims, and it is understood that such modifications and changes naturally fall within the technical scope of the present invention. In addition, the constituent elements in the above embodiments may be freely combined without departing from the gist of the invention.

For example, in the above-described control device 100, at least a part of the acquisition unit 50*a*, the derivation unit 50*b*, the display control unit 50*c*, and the movement instruction unit 50*d* constituting the processing unit 50 may be divided into a plurality of devices. For example, a part of the functions of the acquisition unit 50*a*, the derivation unit 50*b*, the display control unit 50*c*, and the movement instruction unit 50*d* may be implemented by another server.

In addition to being provided in the electric vehicle 10 as in the above-described embodiment, the control device 100 may be provided in another device or system (for example, the power receiving device, the electric power system, or the like).

Further, the control method described in the above embodiment may be implemented by executing a control program prepared in advance on a computer. The control program is stored in a computer-readable storage medium and executed by being read from the storage medium. In addition, the control program may be provided in a form stored in a non-transitory storage medium such as a flash memory, or may be provided via a network such as the Internet. The computer that executes the present control program may be provided in the control device, may be provided in an electronic device such as a smartphone, a tablet terminal, or a personal computer that can communicate with the control device, or may be provided in a server device that can communicate with the control device and the electronic device.

In the present specification, at least the following matters are described. In the parentheses, the corresponding constituent elements and the like in the above embodiment are shown as an example, but the present invention is not limited thereto.

(1) A control device (control device 100) that derives a target parking position of an electric vehicle (electric vehicle 10) in a parking space (parking space 16), in a case where electric power is exchanged in a contactless manner between the electric vehicle and a power receiving device (power receiving device 18) including a primary coil (power receiving coil 19) installed in the parking space and allowed to supply electric power received by the primary coil to a predetermined power grid (power grid 15), the electric vehicle having a secondary coil (power supply coil 20), the control device including:

an acquisition unit (acquisition unit 50*a*) configured to acquire required power information indicating required power, which is a target value of electric power to be supplied to the power grid via the power receiving device; and a derivation unit (derivation unit 50*b*) configured to derive the target parking position based on the acquired required power information and power transmission efficiency information (power transmission efficiency information 40*a*) indicating power transmission efficiency at each of position relationships between the primary coil and the secondary coil, in which the derivation unit derives the target parking position at which a second position relationship different from a first position relationship in which the power transmission efficiency is highest is established, according to an amount of the required power.

According to (1), the target parking position at which the second position relationship different from the first position relationship in which the power transmission efficiency is the highest is established is derived according to the amount of the required power. Accordingly, for example, as compared with a case where the target parking position is derived based on a position at which the power transmission efficiency of coils of a power supply device and the power receiving device is highest without exception, a possibility that the required power is satisfied can be increased.

(2) The control device according to (1), further including:

a display control unit (display control unit 50*c*) configured to display the derived target parking position on a predetermined display unit (display unit 200).

According to (2), a user of the electric vehicle can grasp the target parking position corresponding to the required power, by viewing the display unit.

(3) The control device according to (1), further including:

a movement instruction unit (movement instruction unit 50*d*) configured to instruct the electric vehicle to automatically move to the derived target parking position.

According to (3), the user can save the trouble of moving the electric vehicle to the target parking position by himself/herself, and for example, even a user who is not good at parking can park at the target parking position.

(4) The control device according to (1), in which the required power information is information indicating a time series transition of the required power in a predetermined period, and the derivation unit derives, as the target parking position, a position at which a period for which the required power is satisfied takes a predetermined ratio or more of the predetermined period.

According to (4), for example, the number of candidates of the target parking position to be derived can be increased as compared with a case where a position at which the required power is satisfied in all the periods is derived as the target parking position.

(5) The control device according to (1), in which the power transmission efficiency is a parameter based on a coupling coefficient between the primary coil and the secondary coil, and a Q value.

According to (5), the target parking position can be easily derived as compared with a case where the target parking position is derived using, for example, other data that is not mapped or a separate device.

(6) The control device according to (1), in which the derivation unit further derives the target parking position at which a request for responsiveness when supplying the required power to the power grid is satisfied.

According to (6), the target parking position considering the responsiveness of the required power can be derived.

(7) A control method of a computer that derives a target parking position of an electric vehicle (electric vehicle 10) in a parking space (parking space 16) when electric power is to be exchanged in a contactless manner between the electric vehicle and a power receiving device (power receiving device 18) that includes a primary coil (power receiving coil 19) installed in the parking space and that is capable of supplying electric power received by the primary coil to a predetermined power grid (power grid 15), the electric vehicle having a secondary coil (power supply coil 20), the control method having the step of:

acquiring required power information indicating required power, which is a target value of electric power to be supplied to the power grid via the power receiving device; and deriving the target parking position based on the acquired required power information and power transmission efficiency information (power transmission efficiency information 40*a*) indicating power transmission efficiency at each of position relationships between the primary coil and the secondary coil, in which the target parking position at which a second position relationship different from a first position relationship in which the power transmission efficiency is highest is established is derived according to an amount of the required power.

According to (7), the target parking position at which the second position relationship different from the first position relationship in which the power transmission efficiency is the highest is established is derived according to the amount of the required power. Accordingly, for example, as compared with a case where the target parking position is derived based on a position at which the power transmission efficiency of coils of a power supply device and the power receiving device is highest without exception, a possibility that the required power is satisfied can be increased.

(8) A non-transitory computer-readable storage medium storing a control program causing a computer that derives a target parking position of an electric vehicle (electric vehicle 10) in a parking space (parking space 16) when electric power is to be exchanged in a contactless manner between the electric vehicle and a power receiving device that includes a primary coil (power receiving coil 19) installed in the parking space and that is capable of supplying electric power received by the primary coil to a predetermined power grid (power grid 15), the electric vehicle having a secondary coil (power supply coil 20), the control program causing the computer to perform the process of:

acquiring required power information indicating required power, which is a target value of electric power to be supplied to the power grid via the power receiving device; and deriving the target parking position based on the acquired required power information and power transmission efficiency information (power transmission efficiency information 40*a*) indicating power transmission efficiency at each of position relationships between the primary coil and the secondary coil, in which the target parking position at which a second position relationship different from a first position relationship in which the power transmission efficiency is highest is established is derived according to an amount of the required power.

According to (8), the target parking position at which the second position relationship different from the first position relationship in which the power transmission efficiency is the highest is established is derived according to the amount of the required power. Accordingly, for example, as compared with a case where the target parking position is derived based on a position at which the power transmission efficiency of coils of a power supply device and the power receiving device is highest without exception, a possibility that the required power is satisfied can be increased.

What is claimed is:

1. A control device that derives a target parking position of an electric vehicle in a parking space, in a case where electric power is exchanged in a contactless manner between the electric vehicle and a power receiving device having a primary coil installed in the parking space and allowed to supply electric power received by the primary coil to a predetermined power grid, the electric vehicle having a secondary coil, the control device comprising:

an acquisition unit configured to acquire required power information indicating required power, which is a target value of electric power to be supplied to the power grid via the power receiving device; and a derivation unit configured to derive the target parking position based on the acquired required power information and power transmission efficiency information indicating power transmission efficiency at each of position relationships between the primary coil and the secondary coil, wherein the derivation unit derives the target parking position at which a second position relationship different from a first position relationship in which the power transmission efficiency is highest is established, according to an amount of the required power.

2. The control device according to claim 1, further comprising:

a display control unit configured to display the derived target parking position on a predetermined display unit.

3. The control device according to claim 1, further comprising:

a movement instruction unit configured to instruct the electric vehicle to automatically move to the derived target parking position.

4. The control device according to claim 1, wherein the required power information is information indicating a time series transition of the required power in a predetermined period, and the derivation unit derives, as the target parking position, a position at which a period for which the required power is satisfied takes a predetermined ratio or more of the predetermined period.

5. The control device according to claim 1, wherein the power transmission efficiency is a parameter based on a coupling coefficient between the primary coil and the secondary coil, and a Q value.

6. The control device according to claim 1, wherein the derivation unit further derives the target parking position at which a request for responsiveness when supplying the required power to the power grid is satisfied.

7. A control method of a computer that derives a target parking position of an electric vehicle in a parking space, in a case where electric power is exchanged in a contactless manner between the electric vehicle and a power receiving device including a primary coil installed in the parking space and allowed to supply electric power received by the primary coil to a predetermined power grid, the electric vehicle having a secondary coil, the control method comprising:

acquiring required power information indicating required power, which is a target value of electric power to be supplied to the power grid via the power receiving device; and deriving the target parking position based on the acquired required power information and power transmission efficiency information indicating power transmission efficiency at each of position relationships between the primary coil and the secondary coil, wherein the target parking position at which a second position relationship different from a first position relationship in which the power transmission efficiency is highest is established is derived according to an amount of the required power.

8. A non-transitory computer-readable storage medium storing a control program causing a computer that derives a target parking position of an electric vehicle in a parking space, in a case where electric power is exchanged in a contactless manner between the electric vehicle and a power receiving device including a primary coil installed in the parking space and allowed to supply electric power received by the primary coil to a predetermined power grid, the electric vehicle having a secondary coil, the control program causing the computer to perform:

acquiring required power information indicating required power, which is a target value of electric power to be supplied to the power grid via the power receiving device; and deriving the target parking position based on the acquired required power information and power transmission efficiency information indicating power transmission efficiency at each of position relationships between the primary coil and the secondary coil, wherein the target parking position at which a second position relationship different from a first position relationship in which the power transmission efficiency is highest is established is derived according to an amount of the required power.

* * * * *